United States Patent [19]
Quinn et al.

[11] Patent Number: 4,837,066
[45] Date of Patent: Jun. 6, 1989

[54] FOLDABLE RIGIDIFIED TEXTILE PANELS

[75] Inventors: Patrick A. Quinn, Lewiston; Scott C. Billings, Mechanic Falls, both of Me.

[73] Assignee: Gates Formed-Fibre Products, Inc., Auburn, Me.

[21] Appl. No.: 868,902

[22] Filed: May 29, 1986

[51] Int. Cl.⁴ ............................................. B32B 3/10
[52] U.S. Cl. ........................................... 428/95; 26/7;
428/131; 428/136; 428/137; 428/155; 428/234;
428/235; 428/236; 428/286; 428/300; 493/397;
493/399; 493/405; 493/356
[58] Field of Search .................... 428/43, 95, 131, 136,
428/155, 137, 234, 235, 236, 286, 300; 26/7;
493/356, 397, 399, 405

[56] References Cited

U.S. PATENT DOCUMENTS

| | | | |
|---|---|---|---|
| 262,452 | 8/1882 | McLean | 428/136 |
| 3,293,104 | 12/1966 | Hull | 428/136 |

Primary Examiner—Marion C. McCamish
Attorney, Agent, or Firm—Jack E. Ebel; C. H. Castleman, Jr.; H. W. Oberg, Jr.

[57] ABSTRACT

A carpeting material of nonwoven synthetic thermoplastic resin fibers, capable of being folded so as to fit onto sharply irregular surfaces such as car trunk liners, made by the process of needle-looming a nonwoven carpeting material having higher and lower melting temperature synthetic thermoplastic resin fibers, subjecting the material to sufficient heat to soften and subsequently harden and rigidify one side of the carpeting, and then punching two substantially parallel rows of regularly spaced slots in the back side of the carpeting material. The slots of one row are arranged so that they are staggered in relation to the slots of the parallel row. The arrangement of slots in the back side of the carpeting enables it to be sharply folded while maintaining tear resistance.

26 Claims, 4 Drawing Sheets

FOLDABLE RIGIDIFIED TEXTILE PANELS

This invention relates to a carpeting material for covering irregular surfaces, and more particularly relates to a carpeting material whose backing has been processed so that the carpeting can be made to fit onto areas having sharp angles, such as car trunks.

BACKGROUND OF THE INVENTION

Generally, when the need arises to carpet an irregularly shaped surface, the carpeting material can simply be chemically or mechanically attached to the substrate or flooring. However, if the surface includes an area having a sharp angular surface, such as where the floor of a car trunk meets the wall of a car trunk, it will not be sufficient to simply bend the carpet to fit the contours. The stress imposed on the carpet at the point where it is folded will cause adhesion or attachment to be imperfect, and the appearance of the carpeting will be marred.

A relatively simple way of relieving the stress on the back side of the carpet where it is folded, is to cut a slit in the backing material along the line of folding the carpet. When this method is used however, the effect is for that portion of the carpet that was not slit to become a hinge, which of course will then be the only material left holding the carpeting together. This hinging material will not have as much strength as the carpet as a whole did in terms of ability to resist repeated folding or stresses placed near the area of the fold.

Therefore, there is a need for a carpeting material which has been prepared so as to be capable of fitting onto irregularly contoured surfaces that have sharp bends, has increased strength so as to be able to withstand repeated foldings and so as not to be torn or separated when loads are placed close to the bends or folds in it, and which has an aesthetically pleasing appearance. The present invention meets this need.

SUMMARY OF THE INVENTION

This invention meets the needs previously considered by providing for a carpet or other surface covering material, capable of being folded, that has at least one layer of textile material having a predetermined thickness out of which at least two substantially parallel lines have had rows of juxtaposed openings cut out of them on one side of the material, but which have not been cut to a depth exceeding the thickness of the material. The spacing between the openings in each of these rows in substantially staggered in relation of one row to another. Each opening is elongated and substantially slot-like in shape.

More specifically, in a preferred embodiment of the invention, since carpeting material commonly has a face layer or region and a backing layer or region, two parallel rows of slits, slots or openings are formed by cutting into the backing region of the carpeting where it is desired to locate a fold. The slots run substantially longitudinal and parallel to each other, and they are staggered in such a way that the end of one slot in one row is juxtaposed to a slot in the parallel row, rather than being juxtaposed to an opening between slots in the parallel row. The carpeting is then fitted with the crease of the fold being on the face side of the carpeting.

An object of preparing carpeting or other surface covering material in this way is to manufacture a product which has aesthetically pleasing visual qualities, in that a crisp crease is produced which will closely follow sharp angular contours that are being covered. Another object of the present invention is to prepare carpeting or other surface covering material in a way that minimizes the stresses placed on the material at the fold itself. Yet another object of the invention is to provide for a carpeting or other surface covering material which, despite having cuts in its backing material, will still have the necessary strength to resist tears and failures when subjected to loads or to repeated bending.

A carpeting or other surface covering material made in accordance with this invention will feature a face layer having no visible cuts made in it after it has been installed and is covering a surface that has sharp angular folds or creases in it. Another feature of the present invention is a surface covering material which can be repeatedly bent or folded or which can be subjected to loads in its working environment, and that will exhibit superior resistance to failure or tearing.

A carpet or surface covering material made in accordance with this invention will have several advantages. Firstly, it will yield longer and superior life to the ultimate purchaser, as well as exhibiting improved asethetic appearance. For the manufacturer, fewer final products will be rejected for failure to withstand loads or repeated bending, thereby lowering the costs involved with unacceptable or returned goods. Additionally, the material will have the advantage of being easy to fit along sharp, angular contours. Finally, the simplicity of the method used in accordance with the invention means that the manufacturer will have only a negligible increase in costs.

BRIEF DESCRIPTION OF THE DRAWINGS

The invention in its preferred embodiments will be more particularly described in conjunction with the accompanying drawings in which the numerals designate like parts, and in which.

PREFERRED EMBODIMENTS OF THE INVENTION

Figure 1:
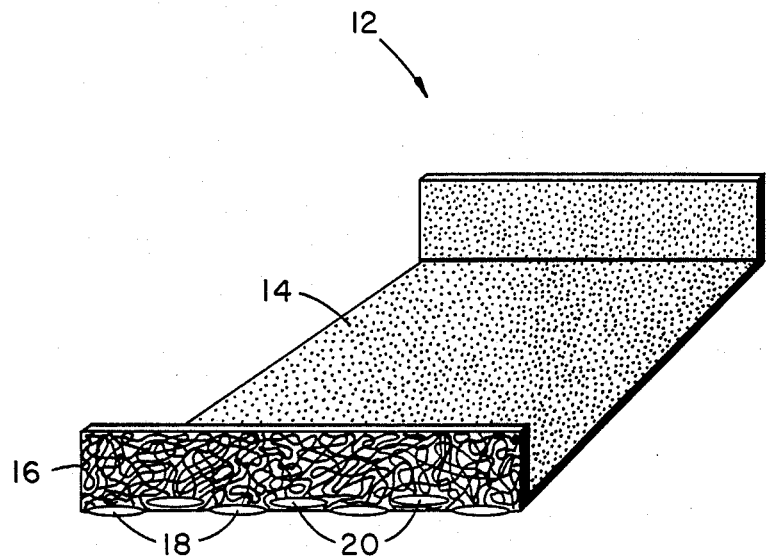
FIG. 1 illustrates a surface covering material of the invention in perspective view, illustrating its facing side and its backing side, which has been prepared so as to allow the material to be sharply folded.

Referring first to FIG. 1 there is shown generally at 12 a most preferred embodiment of the invention, showing a face 14, a base 16, a first row of slots 18 and a second row of slots 20. In a most preferred embodiment, an imperforate material is carpeting which is nonwoven, having been needle-punched and subsequently thermoformed according to methods well known to those skilled in the art. See Adams and Middleton, U.S. Pat. No. 4,424,250, the disclosure of which is incorporated herein by reference. When nonwoven carpeting made according to this technique has been thermoformed, it has a fuzzy surface on the face side 14 and a rigidified surface on the backing side 16. The rigidified backing side 16 in the most preferred embodiment will be a nonwoven cohered mass of synthetic resin fibers which have been raised to a temperature softening point on one side of the carpeting so as to cause them to adhere to one another and rigidify upon cooling, thereby creating the rigidified backing.

This rigidified backing material will not take a sharp fold or crease well. However, if a row of discontinuous slots is cut into this rigidified backing material, the carpet becomes fairly bendable. Then, in accordance with this invention, if a second parallel row of discontinuous slots is cut adjacent and juxtaposed to the first row of slots, in a substantially staggered manner, then the carpet can be bent or folded to almost any angle with a sharp, crisp crease. FIG. 1 shows the first row of the slots 18 parallel to a second row of slots 20. When a panel of the carpeting is folded in the manner shown in FIG. 1, the slots enlarge, taking on a somewhat oval or oblong shape. When this happens, it serves to further illustrate the fact that the slots are acting as stress relievers in the rigidified backing material of the carpeting when it is bent. However, because of the staggered manner in which the parallel rows of slots are cut with relation to one another, enough material is left uncut in the area between the parallel rows and in the areas between the slots themselves, so as to leave the carpeting material relatively strong and resistant to tear after repeated bendings and under the stress of loads.

Figure 2:
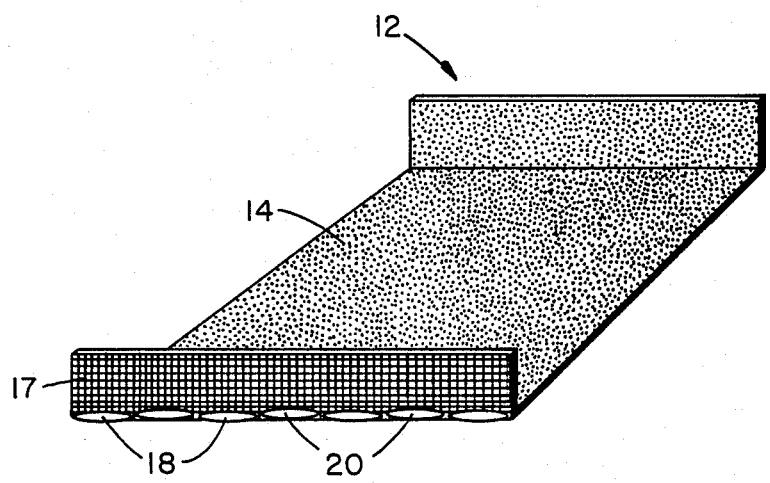
FIG. 2 shows the same view as FIG. 1, except that the back side of the material is a woven substrate.

FIG. 2 illustrates how the invention can be used in carpeting material using a woven backing 17 instead of a nonwoven backing 17. A common woven backing might be of jute or a similar material. Woven backing 17 can be attached to a face side 14 by means of an adhesive.

Figure 3:
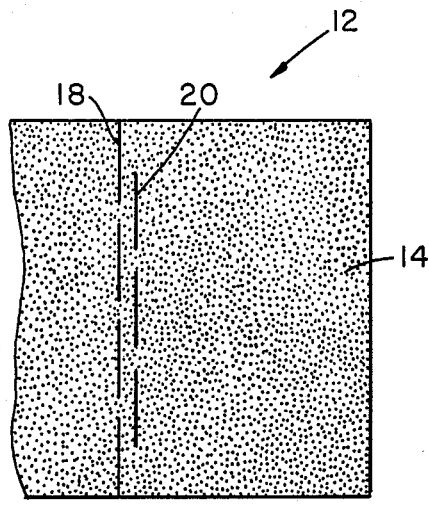
FIG. 3 is a top view of the invention showing a preferred orientation of two rows of parallel slots that have been cut into the back side of the carpet.

Turning now to FIG. 3, there is shown from a top view a portion of the invention, showing the face surface 14 of the panel 12. In this particular instance, slots have been cut through the entire thickness of the panel, although it should be understood that the slots can be cut to any depth not exceeding the thickness of the panel as well.

Figure 4:
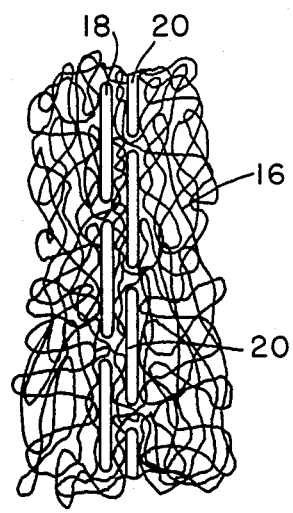
FIG. 4 is a schematic illustration of the slots cut into the back side of the carpeting in a preferred orientation, where the carpeting is using a nonwoven type of backing.
Figure 4A:
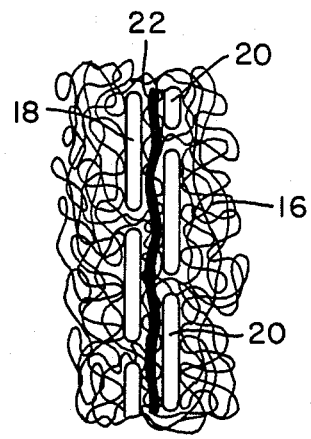
FIG. 4A is a schematic illustration generally showing the area of material providing strength to a folded area that has not been cut into by either parallel row of slots.

FIG. 4 schematically shows a more detailed and magnified view of the appearance of the slots from the back side of the carpeting material. The rigidified backing material 16 has a first row of slots 18 and a second row of slots 20 cut into it. As can be seen in FIG. 4, in a most preferred orientation of the parallel rows of slots, neither the beginning nor the ending of a given slot is juxtaposed to an interslot space in the row of slots parallel to it. This overlapping orientation simultaneously maximizes the length of slotted material which will act as stress relievers as well as the amount of unslotted material remaining to provide strength through repeated bending and when stressed by loads. In FIG. 4A, there can be seen at 22 a serpentine path which courses through the material previously shown in FIG. 4. This serpentine path shows the area of the backing material which is taking up the stress of bending the carpeting.

Figure 5:
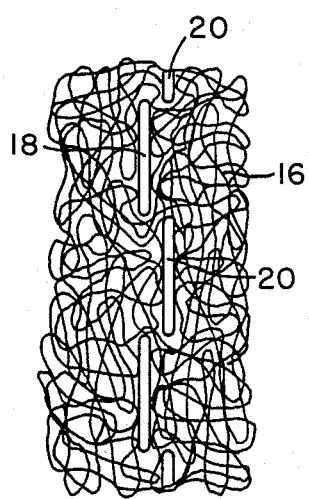
FIG. 5 illustrates an alternative orientation of the parallel rows of slots in the back side of the carpeting.

FIG. 5 shows an alternate orientation of the spacing of slots in first row 18 and second row 20. In this orientation, the beginning and ending of a slot in a first row correspond to the beginning and ending of a space between slots in the parallel row.

Figure 6:
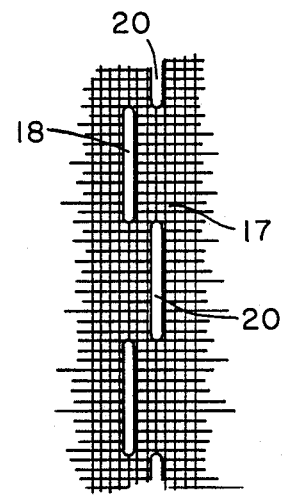
FIG. 6 illustrates an orientation of the parallel rows of slots in the back side of a carpeting using a woven backing material.

FIG. 6 shows an alternative embodiment in which the backing is woven fibers instead of nonwoven fibers. Again, the orientation of the slots provides a good combination of stress-relieving areas and sufficient material not cut by a slot so as to provide sufficient reinforcement and strength.

Figure 7:
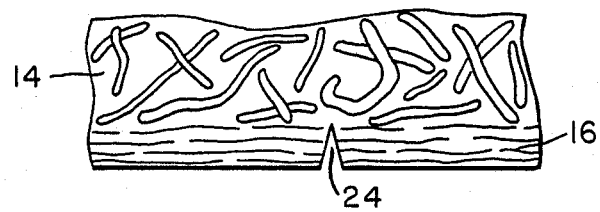
FIG. 7 is a schematic illustration, which from a side view shows a slot or opening in unfolded carpeting material.
Figure 8:
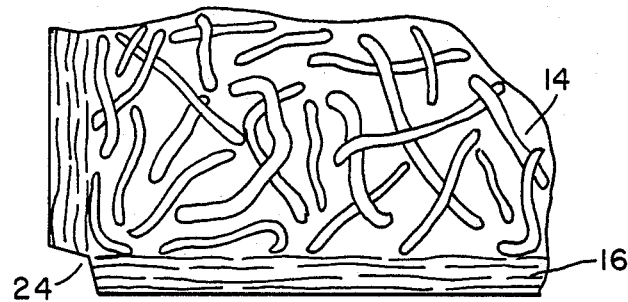
FIG. 8 is a schematic illustration showing the behavior of a slot as the carpeting is folded in a sharp angle.
Figure 9:
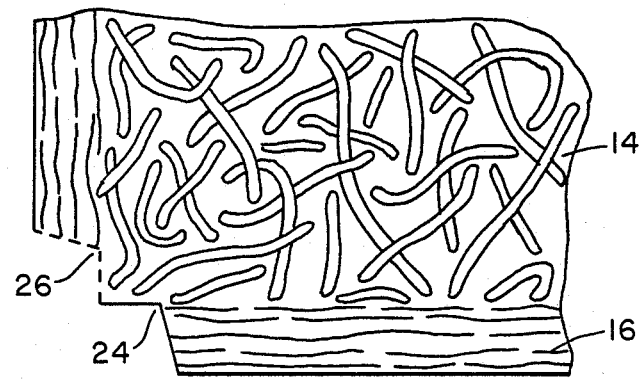
FIG. 9 is a schematic illustration of the behavior of parallel slots in the carpeting when it is folded in a sharp angle.

FIG. 7 schematically depicts a carpeting material which has a base region of one type of fibers 16 and a face region of a second type of fibers 14. The base region fibers 16 have been thermoformed so as to constitute a relatively rigid area. A slot or slit has been cut in the side of the panel which is schematically being depicted in FIG. 7 as a V shaped notch. The carpeting in FIG. 7 is shown in its unfolded, flattened state. In FIG. 8, there is shown the same carpeting as in FIG. 7, except that now the carpeting has been bent at an extreme angle of approximately 90°. This serves to illustrate how the slot or slit 24 opens up, acting as a stress reliever. This is essentially the way that stress relief would be achieved if a single slot were cut continuously or in a discontinuous row along the back side of a carpeting material. The invention, however, has gone one step further, by adding the second parallel row of cut-out slots or slits. This is shown in FIG. 9 by the side view of first slot or slit 24 and the side view of second slot or slit 26. When the carpeting is opened to an extreme angle such as this one, the parallel rows of slots or slits act in tandem as stress relievers.

Cutting the slits, slots or openings into the imperforate material itself may be performed by any means known to those skilled in the art, but is likely to be most efficient if done by means of an automated overhead multi-tined puncher. After the final configuration of the overall carpeting itself has been determined and cut, the carpeting is ready to be inserted or installed in its intended application. Ideal applications for use of the invention would include automobile trunk liners, truck cargo bed liners, automobile passenger floor coverings, and interior floor coverings where the design calls for extending the carpeting to some degree up the sides of the adjoining walls for aesthetic reasons.

It is thought that the foldable rigidified textile panel and method of the present invention and many of its attendant advantages will be understood from the foregoing description, and it will be apparent to those skilled in the art that various changes may be made in the form, construction and arrangement of the parts thereof without departing from the spirit and scope of the invention, or sacrificing all of its material advantages. The forms herein described are merely preferred embodiments, and the description herein should not be construed or interpreted as the only embodiments. Although this description has largely discussed application of this invention to the manufacture of carpeting material for installation in irregularly shaped surfaces, this is only one major application of the technology and other applications to the production of other products are not intended to be precluded. The following claims should therefore be interpreted as broadly as is reasonable.

What is claimed is:

1. A foldable textile surface covering material comprising:
   a textile surface layer;
   a textile substrate layer attached to said textile surface layer; and
   means for permitting said textile surface layer and said textile substrate layer to be folded, said fold permitting means comprising at least two substantially parallel and adjacent rows of juxtaposed slits which have been cut out of the substrate from the substrate side, each row of slits having intervals of spacing, slits of each row being staggered in relation of one row to another such that the end of a given slit in one row is not juxtaposed to a space between slits in an adjacent row.

2. The material as claimed in claim 1, in which the textile surface layer is comprised of a layer of nonwoven fibers.

3. The material as claimed in claim 1, in which the textile surface layer is comprised of a layer of nonwoven fibers of at least one thermoplastic synthetic resin.

4. The material as claimed in claim 1, in which the textile surface layer is a synthetic thermoplastic resin taken from the group consisting of polyethylenes, polypropylenes, polychlals, polyesters, polyamides, and polyphenylene sulfides.

5. The material as claimed in claim 1, in which the textile substrate layer is constructed of woven fibers and the textile surface layer is constructed of nonwoven fibers which have been attached to the woven substrate layer by an adhesive.

6. A method of making a surfacecovering material capable of being folded, comprising the steps of:
   looming at least one layer of textile material having a predetermined desired thickness;
   cutting into the textile and imperforate material to form two substantially parallel and adjacent rows of juxtaposed openings, which have been cut out of the textile material to a depth not exceeding the thickness of the material, the spacing between the openings in each row being substantially staggered in relation to one another; and
   folding the surface-covering material along the two parallel rows of openings, which rows constitute fold lines.

7. The method as recited in claim 6, in which the step of looming makes use of at least one kind of synthetic thermoplastic resin, capable of softening upon being heated to its temperature softening point, and of at least partially fusing upon subsequent cooling.

8. A process of using a surface-covering material capable of being folded made in accordance with the method of claim 6, comprising the steps of:
   folding the material in the orientation of the rows of openings, and installing the material to cover a desired preselected surface.

9. The product used in accordance with the method of claim 8.

10. The product made in accordance with the method of claim 6.

11. A textile panel comprising:
    substantially imperforate material for covering a surface, said substantially imperforate material comprised of at least one layer of textile material; and
    means for permitting said substantially imperforate material to be folded so as to cover said surface, said fold permitting means comprised of at least two substantially parallel and adjacent rows of discontinuous slits, slits of each of said rows being staggered with respect to slits of an adjacent row.

12. The textile panel of claim 11 wherein said substantially imperforate material has a face region and a substantially rigid backing region.

13. The textile panel of claim 12 wherein said slits are cut into said backing region.

14. The textile panel of claim 12 wherein said material is comprised of a first layer of nonwoven textile fibers which defines said face region and a second layer of nonwoven fibers which defines said backing region.

15. The textile panel of claim 12 wherein said material is comprised of a first layer of nonwoven textile fibers which defines said face region and a second layer of woven fibers which defines said backing region.

16. The textile panel of claim 11 wherein said discontinuous slits are cut through said at least one layer.

17. The textile panel of claim 11 wherein said discontinuous slits have a depth which is less than the thickness of said at least one layer.

18. The textile panel of claim 11 wherein said slits of each of said at least two substantially parallel rows are regularly spaced.

19. A textile panel comprising:
    a substantially imperforate material for covering a surface, said substantially imperforate material comprised of at least one layer of textile material; and means for permitting said substantially imperforate material to be folded so as to cover said surface, said fold permitting means comprised of at least two substantially parallel and adjacent rows of discontinuous slits, slits of each of said rows being staggered with respect to slits of an adjacent row, said substantially imperforate material being folded about and in the orientation of said at least two rows.

20. The textile panel of claim 19 wherein said substantially imperforate material has a face region and a substantially rigid backing region.

21. The textile panel of claim 20 wherein said slits are cut into said backing region.

22. The textile panel of claim 20 wherein said material is comprised of a first layer of nonwoven textile fibers which defines said face region and a second layer of nonwoven fibers which defines said backing region.

23. The textile panel of claim 20 wherein said material is comprised of a first layer of nonwoven textile fibers which defines said face region and a second layer of a layer of woven fibers which defines said backing region.

24. The textile panel of claim 19 wherein said discontinuous slits are cut through said at least one layer.

25. The textile panel of claim 19 wherein said discontinuous slits have a depth which is less than the thickness of said at least one layer.

26. The textile panel of claim 19 wherein said slits of each of said at least two substantially parallel rows are regularly spaced.

* * * * *